United States Patent
Hu et al.

(10) Patent No.: US 9,137,047 B2
(45) Date of Patent: Sep. 15, 2015

(54) INSTANT MESSAGING SYSTEM, COMPONENT AND METHOD FOR ADDITIONAL SERVICE

(75) Inventors: Liang Hu, Shenzhen (CN); Haochong Peng, Shenzhen (CN); Caishi Yang, Shenzhen (CN); Min Yang, Shenzhen (CN)

(73) Assignee: Tencent Technology (Shenzhen) Company Ltd., Shenzhen (CN)

( * ) Notice: Subject to any disclaimer, the term of this patent is extended or adjusted under 35 U.S.C. 154(b) by 1282 days.

(21) Appl. No.: 12/648,029

(22) Filed: Dec. 28, 2009

(65) Prior Publication Data

US 2010/0100602 A1    Apr. 22, 2010

Related U.S. Application Data

(63) Continuation of application No. PCT/CN2008/070525, filed on Mar. 18, 2008.

(30) Foreign Application Priority Data

Jul. 13, 2007   (CN) .......................... 2007 1 0118793

(51) Int. Cl.
    *G06F 15/16*    (2006.01)
    *H04L 12/58*    (2006.01)
(52) U.S. Cl.
    CPC .............. *H04L 12/581* (2013.01); *H04L 51/04* (2013.01)
(58) Field of Classification Search
    CPC ....... H04L 51/32; H04L 51/04; H04L 51/046; H04L 12/581; H04L 67/306; G06Q 50/01
    USPC ......................................................... 709/206
    See application file for complete search history.

(56) References Cited

U.S. PATENT DOCUMENTS 7,219,303 B2    5/2007  Fish
7,828,661 B1 *  11/2010 Fish et al. ....................... 463/42
(Continued)

FOREIGN PATENT DOCUMENTS

| CN | 1885861 A | 12/2006 |
| CN | 1956420 A | 5/2007 |
| CN | 101119214 A | 2/2008 |

OTHER PUBLICATIONS

English-language translation of Office Action for Vietnamese Application No. 1-2009-02877, dated Nov. 29, 2011.
(Continued)

*Primary Examiner* — Christopher Biagini
(74) *Attorney, Agent, or Firm* — Marshall, Gerstein & Borun LLP

(57) ABSTRACT

An IM system for an additional service includes: an IM client and at least one IM component adapted to support at least one additional service, between which a common interface is configured. The IM client triggers the at least one IM component via the common interface when a local IM user logs on; and the at least one IM component obtains an identity of at least one IM user other than the local IM user via the common interface, and query, according to the identity, whether the at least one IM user subscribes to one of the at least one additional service supported by the at least one IM component. A component and method for an additional service are also provided. By utilizing the IM system, component and method, extensibility of the IM system can be improved, and costs for extending the IM system can be reduced.

16 Claims, 3 Drawing Sheets

(56) References Cited

U.S. PATENT DOCUMENTS

| | | |
|---|---|---|
| 2003/0105820 A1* | 6/2003 | Haims et al. ............... 709/205 |
| 2004/0133640 A1* | 7/2004 | Yeager et al. ............... 709/204 |
| 2004/0224772 A1* | 11/2004 | Canessa et al. ............... 463/42 |
| 2006/0080640 A1* | 4/2006 | Cheng et al. ............... 717/120 |
| 2006/0271696 A1 | 11/2006 | Chen et al. |
| 2006/0282386 A1 | 12/2006 | Szeto et al. |

OTHER PUBLICATIONS

First Chinese Office Action for Application No. 2007101187937, dated Oct. 16, 2009.

Office Action from Canadian Application No. 2,691,879 dated Feb. 14, 2013.

* cited by examiner

INSTANT MESSAGING SYSTEM, COMPONENT AND METHOD FOR ADDITIONAL SERVICE

CROSS-REFERNECE TO RELATED APPLICATIONS

This is a continuation of International Application No. PCT/CN2008/070525 filed Mar. 18, 2008, which in turn claims the priority benefit of Chinese Patent Application No. 200710118793.7 filed Jul. 13, 2007, the entire respective disclosures of which are incorporated herein be reference.

FIELD OF THE INVENTION

The present invention relates to network communication technology, and particularly, to an Instant Messaging (IM) system, component and method for an additional service.

BACKGROUND OF THE INVENTION

With rapid development of Internet technology, Instant Messaging (IM) tools have been accepted by most netizens. At present, the IM tools have been one of indispensable tools on desktops, and are widely used in both daily entertainment and working. The IM tools are developing to not only provide an instant messaging service, but also provide more and more additional services such as communication and entertainment services. For example, an IM tool may not only support delivery of various facial expression information, images and files, but also support voice chatting, video chatting, interactive music-listening, and online games. These additional services enable an TM user to communicate and enjoy entertainment interactively with other IM users, e.g. his/her IM friends, when chatting using an TM tool.

An IM user may hope to know whether an IM friend subscribes to a different additional service when performing instant messaging with the IM friend, so as to differentiate IM friends subscribing to an additional service from ordinary IM friends (i.e. TM friends that do not subscribe to any additional service), or to differentiate between IM friends subscribing to different additional services, that is, to differentiate IM friends according to addition services. Thereby, an interaction with the IM friends by using the additional services is facilitated. An IM friend is also an IM user at a client other than the local IM client, and may perform an IM service interaction with the local IM user through the IM client of the IM friend and the local IM client. An IM user usually has multiple IM friends, and each IM friend is identified by a unique IM user name. When the IM user logs on the local IM client, the local IM client will present user names of the IM friends on a user interface to be used by the local IM user.

In a current IM tool, a function of supporting at least one additional service may be configured in an IM client. When started, the IM client may query whether IM friends subscribe to one of the at least one additional service one by one, and if an IM friend subscribes to one of the at least one additional service, the IM client may add a mark indicating the additional service subscribed by the IM friend on a local IM user interface.

When the system provides a new additional service, the IM client should be modified accordingly to support the new additional service so that the IM client can query whether an IM friend subscribes to the new additional service. However, this operation increases workload of development and maintenance persons and requires a user to re-install the IM client, which is inconvenient in practice, thus lacks extensibility and costs a lot for extending.

SUMMARY OF THE INVENTION

In view of the above, embodiments of the present invention provide an Instant Messaging (IM ) system, component and method for an additional service, which improves extensibility of the IM system and reduces costs of extending the IM system.

According to an embodiment of the present invention, an IM system for an additional service includes:
an IM client, and at least one IM component adapted to support at least one additional service;
wherein a common interface is configured between the IM client and the at least one IM component,
the IM client is adapted to trigger the at least one IM component via the common interface when a local IM user logs on; and
the at least one IM component is adapted to obtain at least one IM user identity of at least one IM user other than the local IM user via the common interface, and query, according to the at least one IM user identity obtained, whether the at least one IM user subscribes to one additional service of the at least one additional service supported by the at least one IM component.

According to an embodiment of the present invention, a component for an additional service includes:
a first module, adapted to support at least one additional service;
a second module, adapted to obtain, after a local IM user logs on a local IM client, at least one IM user identity of at least one IM user other than the local IM user from the local IM client via a common interface between the component and the local IM client;
a third module, adapted to query, according to the at least one IM user identity obtained, whether the at least one IM user subscribes to one of the at least one additional service supported by the IM component.

The method for additional service according to an embodiment of the present invention includes:
obtaining, by at least one IM component from a local IM client via a common interface configured in the local IM client, at least one IM user identity of at least one IM user other than a local IM user after the local IM user logs on the local IM client, each of the at least one IM component supporting at least one additional service;
querying, by the at least one component according to the at least one IM user identity obtained, whether the at least one IM user subscribes to one of the at least one additional service supported by the at least one IM component.

According to embodiments of the present invention, an IM component queries whether other IM users (i.e. friends of an IM user) subscribe to one of the additional services supported by the IM component. The process only requires invoking a common interface of a local IM client, and does not require the IM client to perform extra processing. Thus, embodiments of the present invention have better extensibility than the conventional art. IM clients only need to provide common interfaces for IM components, and adding or updating of the IM components will not affect the IM clients, i.e. the IM clients do not have to be modified. When a new additional service is to be supported, it is just necessary to update the IM components or add a new IM component into the intelligent system of the local IM client.

DETAILED DESCRIPTION OF THE INVENTION

Figure 1:
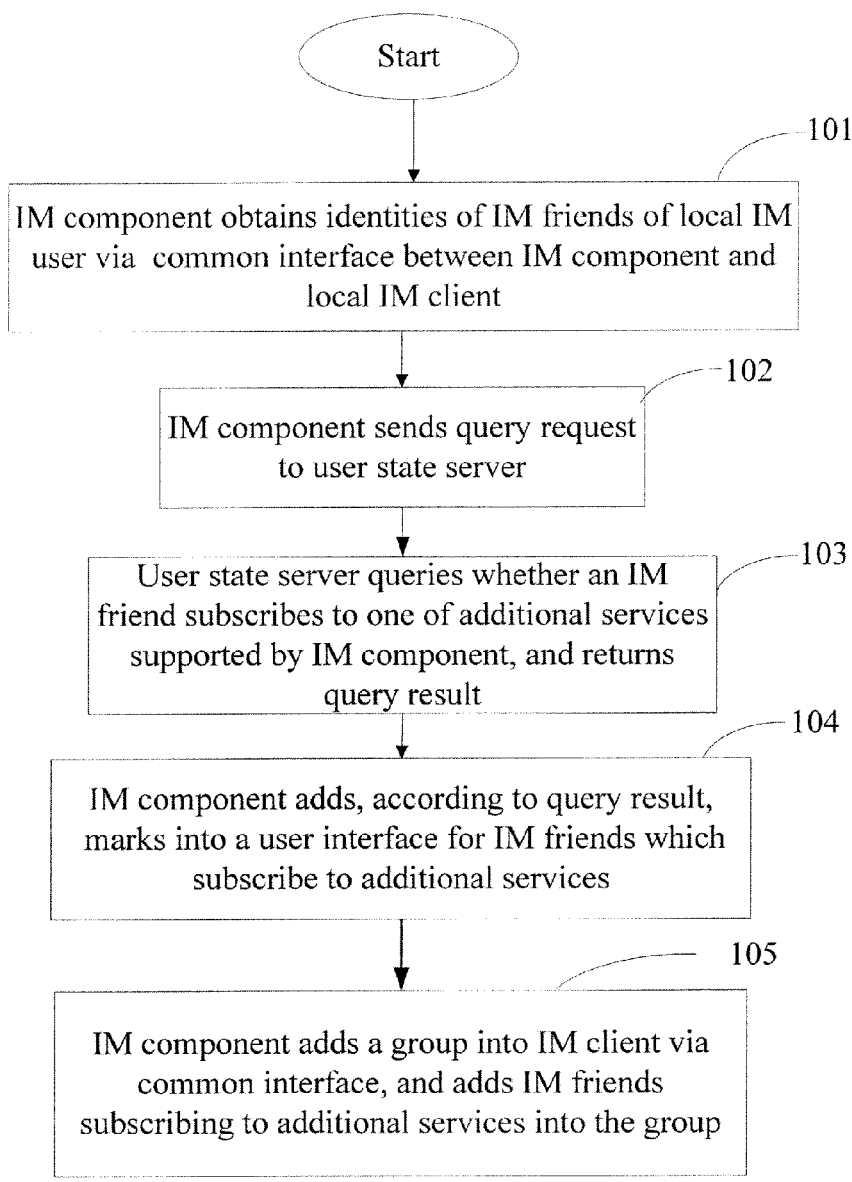
FIG. 1 is a flowchart illustrating a method for querying an additional service in accordance with Embodiment one of the present invention.

According to an embodiment of the present invention, in a method for an additional service, a common interface is configured in a local IM client; via the common interface, the local IM client can exchange information with at least one IM component, and each IM component may support at least one additional service.

After a local IM user becomes online, i.e. after the local IM user logs on the local IM client, the local IM client triggers an IM component. The IM component acquires identities of IM friends of the local. IM user from the local IM client via the common interface, and queries, according to the identities of the IM friends acquired, whether there is at least one IM friend subscribing to one of the additional services supported by the IM component.

Preferably, the local IM client triggers the IM component via the common interface.

Further, when the IM component determines that there is at least one IM friend subscribing to one of the additional services supported by the IM component, the IM component may add a mark indicating the additional service subscribed by each of the at least one IM friend into a user interface of the local IM client (e.g. good friend list interface).

Generally, an additional service is implemented through cooperation of various servers and a plurality of IM clients in an. IM system, e.g. an IM server provides an IM client with network resources required by the additional service, the IM client receives and parses the network resources provided by the IM server. Thus, if a local IM user wants an additional service, e.g. performing interactions with IM friends by means of the additional service or querying and displaying the additional services that the IM friends subscribe, the local IM user should first have a capability of parsing the network resources of the additional service, i.e. a capability of supporting the additional service.

When implementing an additional service, an IM component performs information interaction with a local IM client via a common interface. Via the common interface between the IM component and the local IM client, the IM component may also perform information interaction with other IM clients, i.e. using the local IM client to forward information. The IM component may adopt a dedicated communication protocol to perform the information interaction with a server providing the additional service or user state information. The dedicated communication protocol may vary according to the type of the additional service.

Generally, an IM user may log on an IM system through inputting an IM account into a local IM client. The logon process and operating manner of the local IM client may be in accordance with conventional IM technique, and will not be described herein.

The IM client may be installed into an intelligent system having computing and processing capabilities, such as: a computer system, a Personal Digital Assistant (PDA), an intelligent handset, and so on.

According to an embodiment of the present invention, each IM component has a Universal Unique Identifier (QUID). When an IM user logs on an IM client and becomes online, the IM client may invoke an IM component via a common interface according to a UUID of the IM component, i.e. make the IM component run.

In practice, the IM component may be implemented through various approaches, one of which is an IM Plug-in. The IM Plug-in is a software module programmed by using an application interface conforming to a certain criterion. The IM Plug-in may carry out the method provided by embodiments of the present invention, and further be invoked by the local IM client. The IM Plug-in may be installed and registered in an intelligent system of the local IM client, e.g., installed into a register of an operation system in the intelligent system of the local IM client.

As described above, in embodiments of the present invention, each IM component may support at least one additional service. To be specific, when multiple additional services are to be supported, one IM component may be installed to support the multiple additional services and to operate the multiple additional services, i.e. subsequent operations such as query may be performed on the multiple additional services; or, multiple IM components may be installed and each IM component supports one part of the multiple IM components, and thus each IM component operates its supported part of the multiple IM components.

Figure 2:
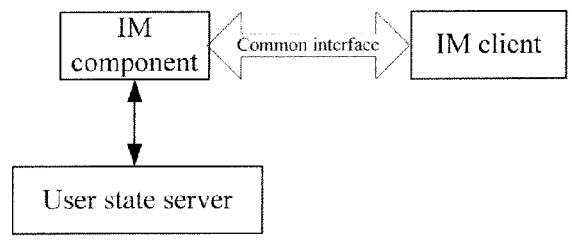
FIG. 2 is a schematic diagram illustrating a structure of an IM system for querying an additional service in accordance with Embodiment one of the present invention.

FIG. 1 is a flow chart illustrating a method for querying an additional service in accordance with Embodiment one of the present invention. According to Embodiment one, an IM component adopts the C/S mode to query whether an IM friend of a local IM user subscribes to an additional service supported by the IM component. The method in this embodiment also employs a user state server, and a structure of an IM system for querying the additional service is shown in FIG. 2.

The user state server records, in advance, identity information of users subscribing to additional services. The recording may be implemented according to the following. After starting up, each IM client triggers a local IM component to submit user state information to the user state server. The user state information may include identity information of a local IM user (i.e. an IM user logging on the local IM client to become online) and identity information of an additional service subscribed by the local IM user. When receiving the user state information, the user state server records the identity information of users subscribing to the additional services. The user state server may record user identity information corresponding to an additional service, or record user identity information corresponding to more than one additional service, and each additional service may be identified by a different identity.

The method of Embodiment one of the present invention will be described hereinafter by taking one IM component as an example. Referring to FIG. 1, the method mainly includes the following steps.

In step 101, an IM component accesses a list of IM friends of a local IM user via a common interface between the IM component and an IM client, and obtains identities of the IM friends. An identity of an IM friend may be an IM account of the IM friend. In this step, the IM component may traverse the list of the IM friends of the local IM user to obtain identities of all IM friends of the local IM user, or to obtain identities of online IM friends of the local IM user (i.e. identities of IM friends logging on the IM system).

In step 102, the IM component sends a query request to a user state server. The query request may include the identities of the IM friends obtained in step 101 and the identities of additional services supported by the IM component. In this embodiment, the IM component communicates with the user state server over a dedicated protocol, which is faster than via the IM client In step 103, after receiving the query request, the user state server queries whether IM users corresponding to the identities of the IM friends contained in the query request subscribe to one of the additional services supported by the IM component, and returns a query result to the IM component. The query result includes a corresponding relationship between an identity of an IM friend and an identity of an additional service.

When the C/S mode is adopted for the query, the address information of the user state server should also be configured in the IM component, so that the IM component may communicate with the user state server according to the address information. It should be noted that the IM system may have more than one user state server, and different user state servers provide querying of different additional services. The user state server may be a server for a specific additional service, e.g. for an online game service, the user state server may be an authentication server of an online game.

In step 104, after receiving the query result from the user state server, the IM component invokes a common interface provided by a local IM client according to the corresponding relationship between the identity of the additional service and the identity of the IM friend, modifies a user interface of the local IM client, and adds a mark for each IM friend in the query result to indicate the additional service subscribed by the IM friend, e.g. displays the added mark beside the IM friend. The added mark may be: an icon, an avatar, a text, a Uniform Resource Locator (URL) link, and so on.

In step 105, the IM component invokes the common interface of the local IM client, modifies the user interface of the local IM client, groups the IM friends in the user interface. Each group includes IM friends subscribing to at least one identical additional service with each other.

Because the IM component may support more than one additional service, the grouping may be implemented in various ways. It is supposed that the IM component supports three types of additional services A, B and C, and that IM friends of the IM user respectively subscribe to one or more of the three additional services. Thereby, there may be six approaches for grouping the IM friends, i.e. a group for A (including IM friends subscribing to additional service A), a group for B, a group for C, a group for A B (including IM friends subscribing to additional services A and B), a group for AC, a group for BC and a group for ABC (including IM friends subscribing to additional services A, B and C). According to an embodiment of the present invention, the user may be provided with a user interface to select a grouping approach. It is possible that one IM friend is grouped to multiple groups, thus each group may only establish an index link to the IM friends.

For example, when the IM component supports the online game service, which one type of additional service, according to an embodiment of the present invention, the IM friends subscribing to the online game service may be marked and the common interface may be invoked to automatically generate a group and to add all IM friends marked as subscribing to the online game service into the group. As such, subsequent operations such as game invitation may be facilitated.

Steps 104 and 105 need not be performed in a fixed order, i.e. step 105 may be performed prior to step 104. Or, only one of steps 104 and 105 may be performed, or neither is performed.

Figure 3:
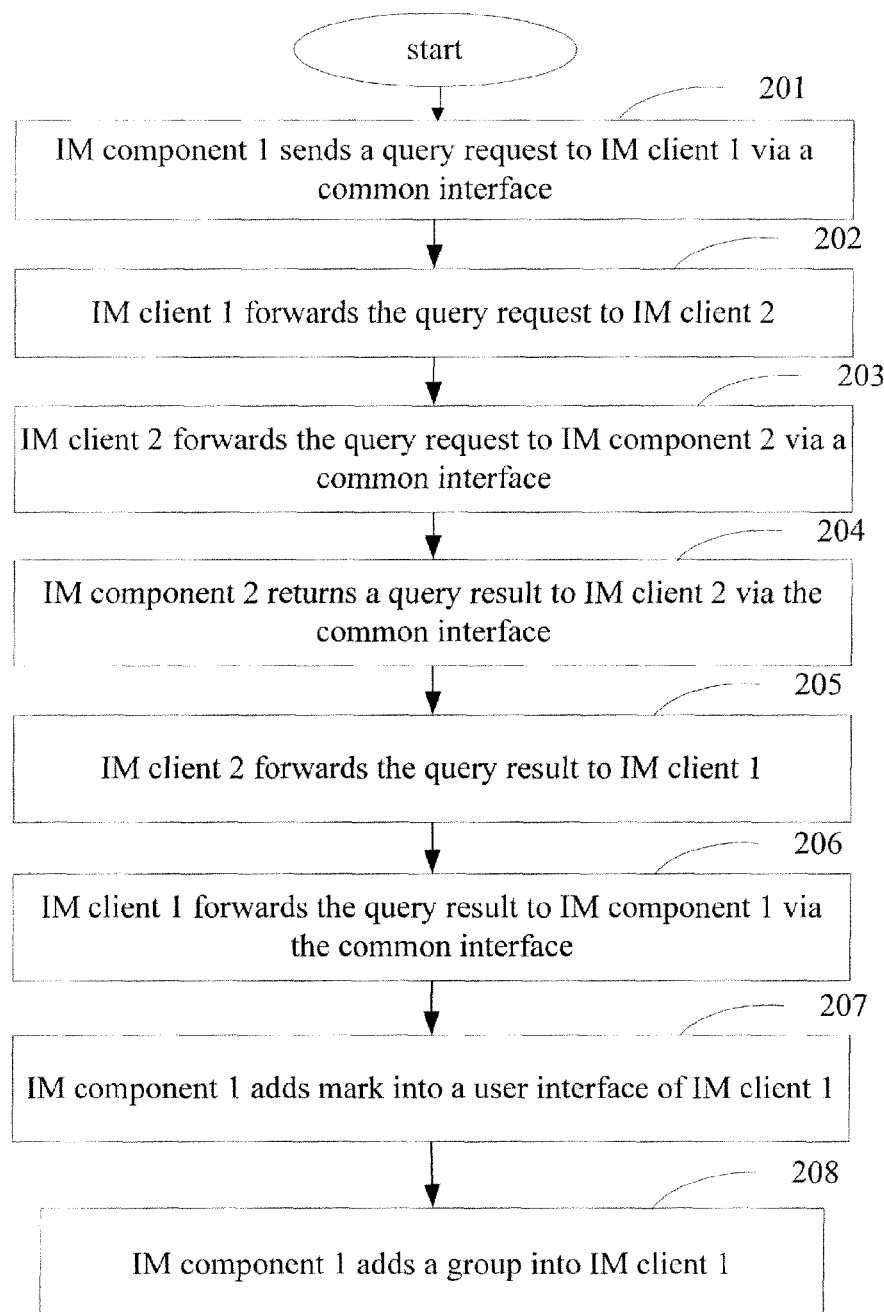
FIG. 3 is a flowchart illustrating a method for querying an additional service in accordance with Embodiment two of the present invention.
Figure 4:
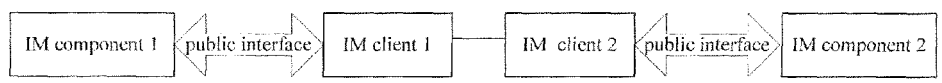
FIG. 4 is a schematic diagram illustrating a structure of an IM system for querying an additional service in accordance with Embodiment two of the present invention.

FIG. 3 is a flow chart illustrating a method for querying an additional service in accordance with Embodiment two of the present invention. In Embodiment two, an TM component adopts the Client/Client (C/C) mode to query whether IM friends of a local IM user subscribe to the additional services supported by the IM component. Because the C/C mode requires no user state server, the C/C mode may be utilized when the user state server is busy or unavailable. A structure of an IM system for querying an additional service in accordance with this embodiment is shown in FIG. 4.

In the C/C mode for query, the IM component sends a query request to an TM client of an IM friend of a local IM user via a common interface provided by a local IM client. After receiving the query request, the IM client of the IM friend invokes an IM component of the IM client to query whether the IM friend subscribes to one of the additional services supported by the IM component, and returns a query result to the local IM client initiating the query request. The local IM client may exchange the query request and the query result with the IM client of the IM friend via an IM server or via a P2P mode. The method of Embodiment two of the present invention will be described hereinafter by taking one IM component as an example. As shown in FIG. 3, the method mainly includes the following steps.

It is supposed that a local IM component is IM component 1, a local IM client is IM client 1, an IM client of an IM friend is IM client 2, an IM component of the IM client of the IM friend is IM component 2. The method mainly includes the following steps.

In step 201, the IM component 1 accesses an IM friend list of the IM client 1 via a common interface between the IM component 1 and the IM client 1, and obtains an identity of an IM friend of the IM client 1. The IM component 1 invokes the common interface of the IM client 1 to send the IM client 1 a query request. The query request is used to query whether the IM friend subscribes to one of additional services supported by the IM component 1. Further, the query request may include the identity of the IM friend and identities of additional services supported by the IM component 1, and may further include the identity of the IM component 1.

In step 202, the IM client 1 forwards the query request to the IM client 2. The IM client 1 and the IM client 2 interact by conventional network communication means.

In step 203, after receiving the query request, the IM client 2 forwards the query request to the IM component 2 via a common interface of the IM client 2. Preferably, the IM component 2 and the IM component 1 have the same UUID, i.e. they are the same IM component. When multiple IM components are installed in the IM client 2, the IM client 2 retrieves the UUID of the IM component 1 from the query request, and forwards the query request to the IM component 2 with the same UUID.

In step 204, the IM component 2 queries whether the IM friend subscribes to one of the additional services supported by the IM component 1, and returns a query result to the IM client 2 via the common interface of the IM client 2.

In step 205, the IM client 2 forwards the query result to the IM client 1.

In step 206, the IM client 1 forwards the query result to the IM component 1 via the common interface of the IM client 1.

In step 207, after receiving the query result from the IM component 2, the IM component 1 queries whether the IM friend subscribes to one of the additional services supported by the IM component 1 (or the IM component 2) according to the query result. If the IM friend subscribes to one of the additional services supported by the IM component 1, the IM component 1 invokes the common interface of the IM client 1 to modify a user interface of the IM client 1 by adding a mark for the IM friend to indicate the additional service subscribed by the IM friend.

In step 208, the IM component 1 invokes the common interface of the IM client 1 to modify the user interface of the IM client 1, adds at least one group in the user interface. Each group includes IM friends subscribing to at least one identical additional service with each other. This step is similar to step 105, and will not be described again.

The step 208 may be performed after the IM client 1 finishes querying for states of all IM friends or all online IM friends according to steps 201 to 207.

Steps 207 and 208 need not be performed in a fixed order, i.e. step 208 may be performed prior to step 207. Or, only one or neither of steps 207 and 208 is performed according to requirements.

According to Embodiment two of the present invention, there may be another case, i.e. the IM client 2 itself supports the additional services and is capable of querying whether a local IM user of the IM client 2 subscribes to the additional services supported by the IM client 2. In this case, the IM client 2 does not have to invoke its local IM component, but directly performs the query and returns the query result to the IM client 1 instead.

Figure 5:
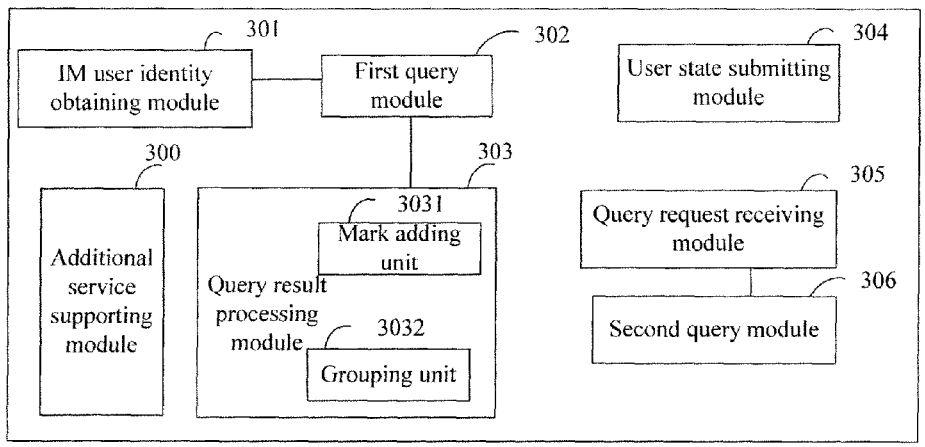
FIG. 5 is a schematic diagram illustrating a structure of an IM component for querying an additional service in accordance with Embodiment three of the present invention.

FIG. 5 is a schematic illustrating a structure of an IM component for querying for additional service in accordance with Embodiment three of the present invention. As shown in FIG. 5, the IM component includes an additional service supporting module 300, an IM user identity obtaining module 301, a first query module 302, a query result processing module 303, a user state submitting module 304, a query result transmitting and receiving module 305 and a second query module 306. The query result processing module 303 includes a mark adding unit 3031 and a grouping unit 3032.

The additional service supporting module 300 is adapted to parse network resources corresponding to at least one additional service so as to support the at least one additional service.

The IM user identity obtaining module 301 is adapted to obtain from a local client at least one identity of at least one IM user other than a local IM user via a common interface provided by the local IM client after the local IM user logs on the local IM client.

The first query module 302 is adapted to query whether the at least one IM user subscribes to one of additional services supported by the IM component according to the at least one identity of the at least one IM user obtained by the IM user identity obtaining module 301. The querying process may include: sending a query request to a user state server, or to the local IM client via a common interface provided by the local IM client. The query request may be sent according to practical situations, e.g. the query request is sent to the user state server in a default situation and is sent to the local IM client when the user state server is busy or unavailable.

The query result processing module 303 is adapted to process the query result from the first query module 302. The mark adding unit 3031 is adapted to add, according to the query result, a mark for an IM user into a user interface of the local IM client via the common interface provided by the local IM client. The mark indicates the additional service subscribed by the IM user. The grouping unit 3032 is adapted to add, according to the query result, at least one group into the user interface of the local IM client via the common interface provided by the local IM client. Each group includes IM friends subscribing to at least one identical additional service with each other.

The user state submitting module 304 is adapted to submit user state information to a user state server after the local IM user logs on the local IM client. The user state information may include an identity of the local IM user and an identity of an additional service subscribed by the local IM user.

The query request transmitting and receiving module 305 is adapted to receive the query request sent from the local IM terminal via the common interface, and forward the query request to the second query module 306. The query request may include the identity of the local IM user and at least one identity of at least one additional service.

The second query module 306 is adapted to query whether the local IM user subscribes to one of the additional services contained in the query request, and return the query result to the query request transmitting and receiving module 305. The query request transmitting and receiving module 305 is further adapted to send the query result to the local IM terminal via the common interface provided by the local IM terminal.

The method of embodiments of the present invention is preferably applicable to IM clients with common interfaces. The IM component can support new additional services. Further, the IM component can invoke a common interface between the IM component and the IM client so as to interact with other IM users based on the additional services, to query whether an IM friend subscribes to the additional services supported by the IM component, and to add a service mark into a user interface of the IM client. Thus, when a new additional service is provided, it is not necessary to modify existing IM clients but just to update the IM component or to develop a new IM component.

The foregoing is only preferred embodiments of the present invention. The protection scope of the present invention, however, is not limited to the above description. Any change or substitution, within the technical scope disclosed by the present invention, easily occurring to those skilled in the art should be covered by the protection scope of the present invention.

What is claimed is:

1. An Instant Messaging (IM) system for an additional service, comprising:
   an IM client device including a processor coupled to a memory storing instructions for execution by the processor, and at least one IM component loaded in a computer device and configured to parse network resources corresponding to at least one additional service as to support the at least one additional service, wherein the at least one IM component is installed and registered in a system where the IM client device is in;
   wherein a common interface is configured between the IM client device and the at least one IM component;
   the IM client device is configured to trigger the at least one IM component via the common interface when a local IM user logs on; and
   the at least one IM component is configured to (i) obtain at least one IM user identity of at least one IM user other than the local IM user via the common interface, (ii) send a query request to query, according to the at least one IM user identity obtained, whether the at least one IM user subscribes to one additional service of the at least one additional service supported by the at least one IM component, and (iii) add, via the common interface according to a query result, a mark for the at least one IM user into a user interface of the IM client device, the mark indicating the additional service subscribed by the at least one IM user;

wherein the query request comprises the at least one IM user identity obtained and at least one identity of the at least one additional service supported by the at least one IM component.

2. The system of claim 1, further comprising a user state server;

wherein the at least one IM component is configured to send the query request to the user state server;

the user state server is configured to query whether the at least one IM user corresponding to the at least one IM user identity subscribes to one of the at least one additional service supported by the at least one IM component, and return a query result to the at least one IM component.

3. The system of claim 2, wherein the at least one IM component is further configured to submit user state information to the user state server after the local IM user logs on the local IM client device, and the user state information comprises an identity of the local IM user and an identity of an additional service subscribed by the local IM user; and the user state server is further configured to record the user state information after receiving the user state information from the at least one IM component.

4. The system of claim 1, further comprising a second IM client device, wherein an IM user corresponding to one of the at least one IM user identity obtained by the at least one IM component logs on the second IM client device; and the at least one IM component is configured to send the query request to the second IM client device via the common interface and via the IM client device;

the second IM client device is configured to query whether the IM user subscribes to one of the at least one additional service supported by the at least one IM component, and return a query result to the IM client device; and the IM client device is configured to receive the query request from the at least one IM component via the common interface, forward the query request to the second IM client device, receive the query result from the second IM client device, and forward the query result to the at least one IM component via the common interface.

5. The system of claim 1, wherein the at least one IM component is further configured to add, via the common interface according to a query result, at least one group into a user interface of the IM client device via the common interface for the at least one IM user; each group comprising at least one IM user subscribing to at least one identical additional service.

6. The system of claim 1, wherein the at least one IM component is implemented by a Plug-in.

7. An apparatus comprising a component for an additional service, loaded in a computing device comprising a processor coupled to a memory storing instructions for execution by the processor, the component comprising:

a first module in the computing device, when executed by the processor of the computing device, configured to parse network resources corresponding to at least one additional service so as to support the at least one additional service;

a second module in the computing device, when executed by the processor of the computing device, configured to obtain, after a local IM user logs on a local IM client, at least one IM user identity of at least one IM user other than the local IM user from the local IM client via a common interface configured between the component and the local IM client;

a third module in the computing device, when executed by the processor of the computing device, configured to send a query request to query, according to the at least one IM user identity obtained, whether the at least one IM user subscribes to one of the at least one additional service supported by the component;

wherein the query request comprises the at least one IM user identity obtained and at least one identity of the at least one additional service supported by the at least one IM component; and a fourth module in the computing device, when executed by the processor of the computing device, configured to process a query result from the third module;

wherein the fourth module in the computer device is configured to add, via the common interface according to the query result from the third module, a mark for the at least one IM user into a user interface of the local IM client, the mark indicating the additional service subscribed by the at least one IM user.

8. The component of claim 7, further comprising:

a fifth module in the computing device, when executed by the processor of the computing device, configured to submit user state information to a user state server after the local IM user logs on the local IM client, wherein the user state information comprises an identity of the local IM user and an identity of an additional service subscribed by the local IM user.

9. The component of claim 7, wherein the fourth module in the computing device is configured to add, via the common interface between the component and the local IM client according to the query result, at least one group into the user interface of the local IM client, each group comprising IM friends subscribing to at least one identical additional service.

10. The component of claim 7, further comprising:

a sixth module in the computing device, when executed by the processor of the computing device, configured to receive a query request from the local IM client via the common interface between the component and the local IM client, forward the query request to a seventh module, receive the query result from the seventh module and send the query result to the local IM client via the common interface between the component and the local IM client, wherein the query request comprises an identity of the local IM user and at least one identity of the at least one additional service;

the seventh module in the computing device, configured to query whether the local IM user subscribes to one of the at least one additional service contained in the query request, and return a query result to the sixth module.

11. A method for an additional service, comprising:

obtaining, by at least one IM component from a local IM client via a common interface configured between the local IM client and the at least one IM component, at least one IM user identity of at least one IM user other than a local IM user after the local IM user logs on the local IM client, each of the at least one IM component supporting at least one additional service, wherein the at least one IM component is installed and registered in a system where the local IM client is in;

sending a query request, by the at least one IM component according to the at least one IM user identity obtained, to query whether the at least one IM user subscribes to one of the at least one additional service supported by the at least one IM component;

wherein the query request comprises the at least one IM user identity obtained and at least one identity of the at least one additional service supported by the at least one IM component; and adding, by the at least one IM component via the common interface according to a query result, a mark for the at least one IM user into a user interface of the local IM client, the mark indicating the additional service subscribed by the at least one IM user.

12. The method of claim 11, further comprising:

submitting, by the at least one IM component, user state information to a user state server, wherein the user state information comprises information of an additional service subscribed by the local IM user and an identity of the local IM user; and recording, by the user state server, the identity of the local IM user and an identity of the additional service subscribed by the local IM user after receiving the user state information.

13. The method of claim 12, wherein the operation of sending the query request to query whether the at least one IM user subscribes to one of the at least one additional service comprises:

sending, by the at least one IM component, the query request to the user state server; and querying, by the user state server, whether the at least one IM user subscribes to one of the at least one additional service supported by the at least one IM component, and returning a query result to the at least one IM component.

14. The method of claim 12, wherein the operation of sending the query request to query whether the at least one IM user subscribes to one of the at least one additional service comprises: sending, by the at least one IM component, the query request to the local IM client via the common interface;

forwarding, by the local IM client, the query request to an IM client of an IM user corresponding to one of the at least one IM user identity obtained by the at least one IM component; and receiving, by the at least one IM component, the query result forwarded by the local IM client via the common interface.

15. The method of claim 11, further comprising:

receiving, by the at least one IM component via the common interface, a query request which is forwarded by the local IM client and is from another IM client, wherein the query request comprises an identity of the local IM user and at least one identity of at least one additional service;

querying, by the at least one component, whether the local IM user subscribes to one of the at least one additional service contained in the query request, and returning a query result to the local IM client via the common interface;

forwarding, by the local IM client, the query result to the another IM client.

16. The method of claim 11, further comprising:

adding, by the at least one IM component via the common interface according to a query result, at least one group for the at least one IM user into a user interface of the IM client, wherein each of the at least one group comprises at least one IM user subscribing to at least one identical additional service.

* * * * *

UNITED STATES PATENT AND TRADEMARK OFFICE
CERTIFICATE OF CORRECTION

PATENT NO. : 9,137,047 B2  
APPLICATION NO. : 12/648029  
DATED : September 15, 2015  
INVENTOR(S) : Liang Hu et al.

Page 1 of 1

It is certified that error appears in the above-identified patent and that said Letters Patent is hereby corrected as shown below:

Title Page, Item (75) line 3, "Min Yang" should be -- Min Yan --

Signed and Sealed this  
Fifth Day of July, 2016

Michelle K. Lee  
*Director of the United States Patent and Trademark Office*